(12) United States Patent
Takezawa et al.

(10) Patent No.: US 10,704,725 B2
(45) Date of Patent: Jul. 7, 2020

(54) SAFETY JOINT

(71) Applicant: TATSUNO CORPORATION, Tokyo (JP)

(72) Inventors: Masahiro Takezawa, Tokyo (JP); Yuki Terasoma, Tokyo (JP); Kiyoshi Kimura, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 142 days.

(21) Appl. No.: 16/032,446

(22) Filed: Jul. 11, 2018

(65) Prior Publication Data

US 2019/0017642 A1    Jan. 17, 2019

(30) Foreign Application Priority Data

Jul. 11, 2017   (JP) .................................. 2017-135265

(51) Int. Cl.
| | | |
|---|---|---|
| *F16L 55/10* | (2006.01) | |
| *F16L 39/02* | (2006.01) | |
| *F16L 37/36* | (2006.01) | |
| *F17C 5/00* | (2006.01) | |
| *B67D 7/04* | (2010.01) | |

(Continued)

(52) U.S. Cl.
CPC ................ *F16L 39/02* (2013.01); *B67D 7/04* (2013.01); *B67D 7/3209* (2013.01); *B67D 7/54* (2013.01); *F16L 37/36* (2013.01); *F16L 55/10* (2013.01); *F16L 55/1015* (2013.01); *F17C 5/00* (2013.01); *B67D 7/38* (2013.01); *F16L 57/02* (2013.01)

(58) Field of Classification Search
CPC .......................... F16L 55/1015; F16L 55/1022
USPC .............................................................. 285/1
See application file for complete search history.

(56) References Cited

U.S. PATENT DOCUMENTS

| | | | | |
|---|---|---|---|---|
| 4,269,226 A | * | 5/1981 | Allread | F16L 37/23 137/614 |
| 5,135,029 A | * | 8/1992 | Anderson | F16L 35/00 137/614.04 |

(Continued)

FOREIGN PATENT DOCUMENTS

| | | | | |
|---|---|---|---|---|
| EP | 3333469 A1 | 6/2018 | | |
| EP | 3333473 A1 * | 6/2018 | .......... | F16L 55/1108 |

(Continued)

OTHER PUBLICATIONS

Extended European Search Report for EP 18 18 2082; dated Dec. 20, 2018.

*Primary Examiner* — David Bochna
(74) *Attorney, Agent, or Firm* — Stetina Brunda Garred and Brucker; Mark B. Garred

(57) ABSTRACT

A safety joint capable of preventing a moment generated by swinging of a filling hose from acting on the safety joint when a tensile force more or equal to a predetermined value is applied to the filling hose. The safety joint includes a plug with a cylindrical shape in which a passage is formed, a socket in which a passage continuing to the passage in the plug is formed, and a shut off valve mounted on the passage in the socket. The shut off valve opens when the plug is inserted into the socket and closes when the plug is disconnected therefrom. Central axes of the passages of the plug and the socket form a straight line. A filling hose is connected to the plug, and a hose guide for limiting movement of the filling hose at a position separated from the plug.

7 Claims, 8 Drawing Sheets

(51) Int. Cl.
    *B67D 7/32*    (2010.01)
    *B67D 7/54*    (2010.01)
    *F16L 57/02*    (2006.01)
    *B67D 7/38*    (2010.01)

(56) References Cited

U.S. PATENT DOCUMENTS

| | | | | |
|---|---|---|---|---|
| 5,222,520 A | * | 6/1993 | Anderson | F16L 35/00 137/327 |
| 5,695,221 A | * | 12/1997 | Sunderhaus | F16L 55/1015 251/149.7 |
| 7,980,173 B2 | * | 7/2011 | Carmack | B30B 9/3046 100/240 |

FOREIGN PATENT DOCUMENTS

| | | |
|---|---|---|
| GB | 2081832 A | 2/1982 |
| JP | 07035894 U | 7/1995 |
| JP | 2004293777 A | 10/2004 |
| JP | 2007120717 A | 5/2007 |

\* cited by examiner

[Fig. 1]
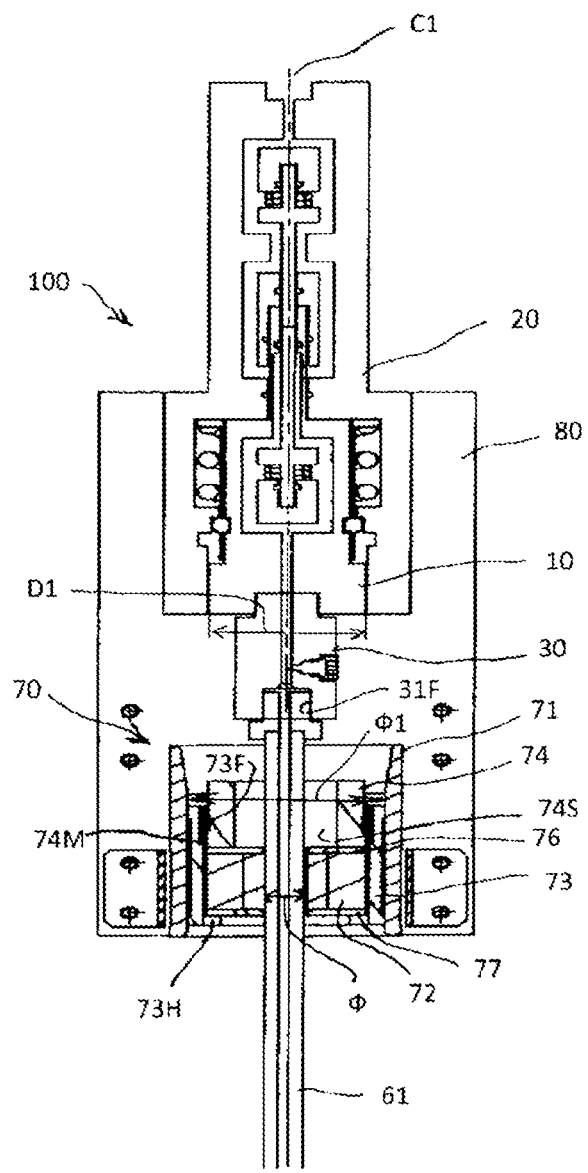

[Fig. 2]
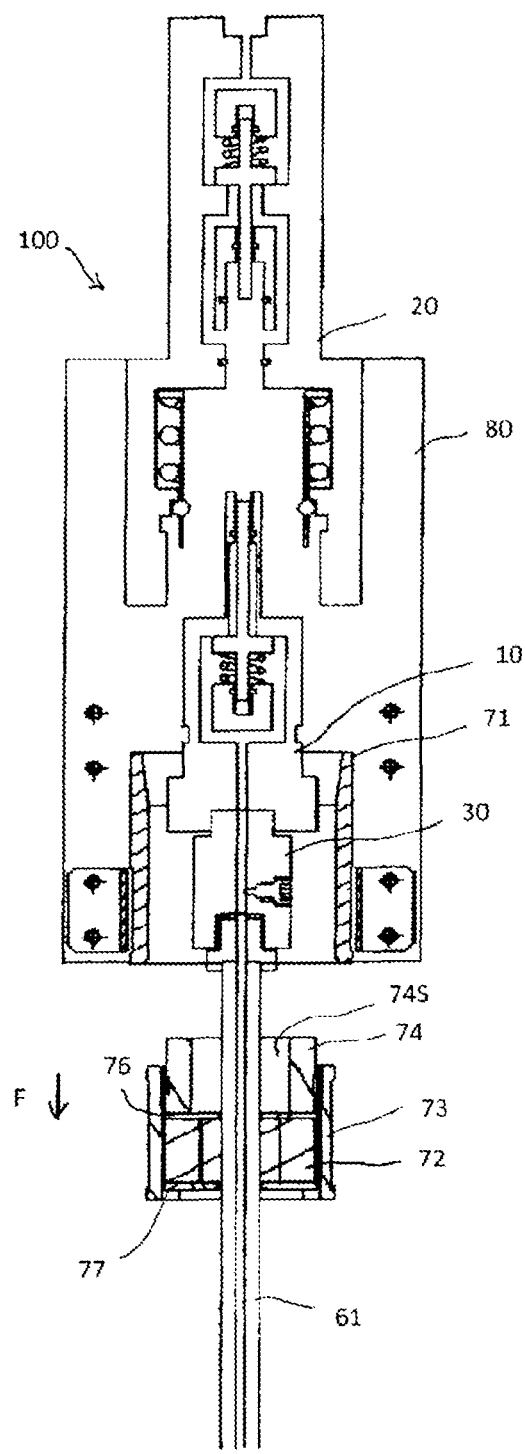

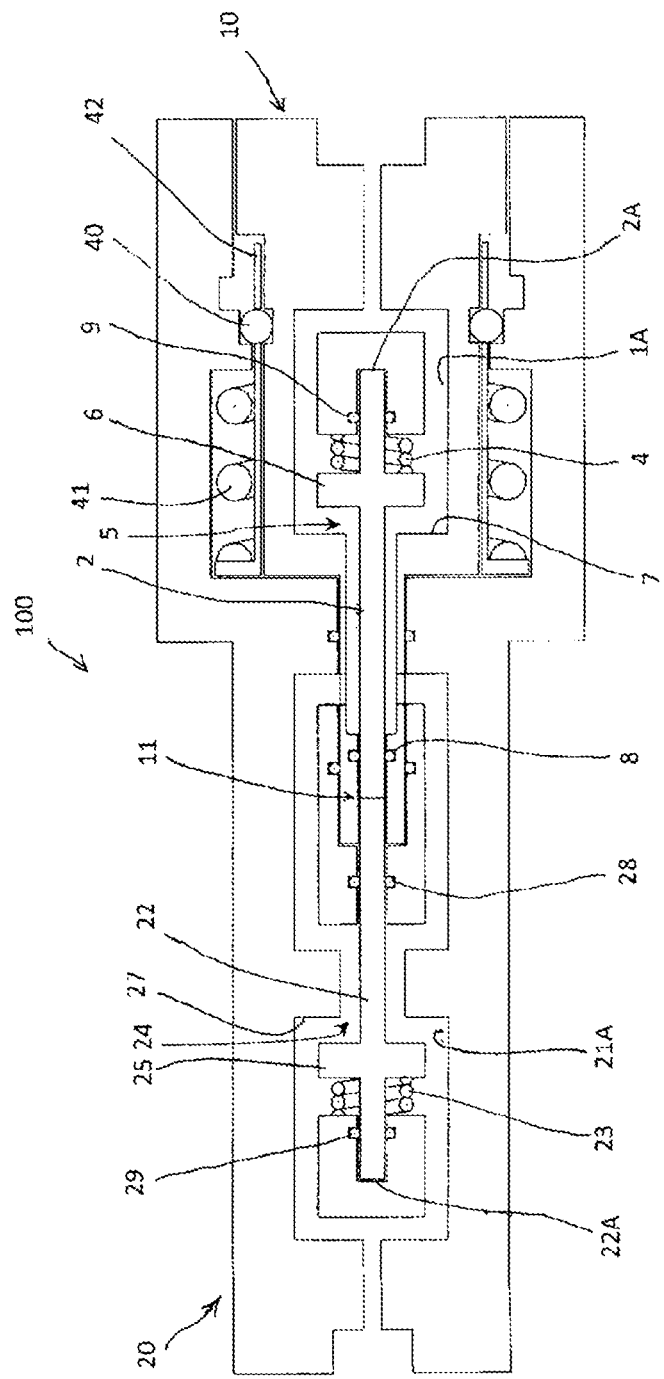
[Fig. 3]

[Fig. 4]
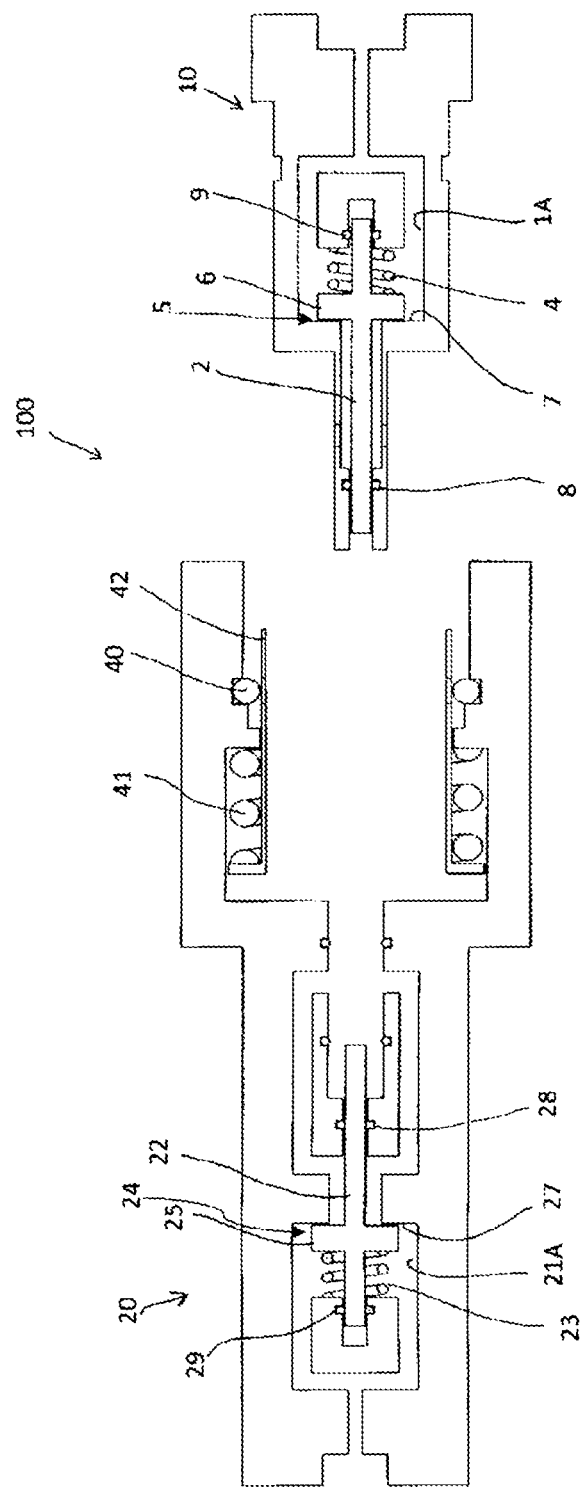

[Fig. 5]
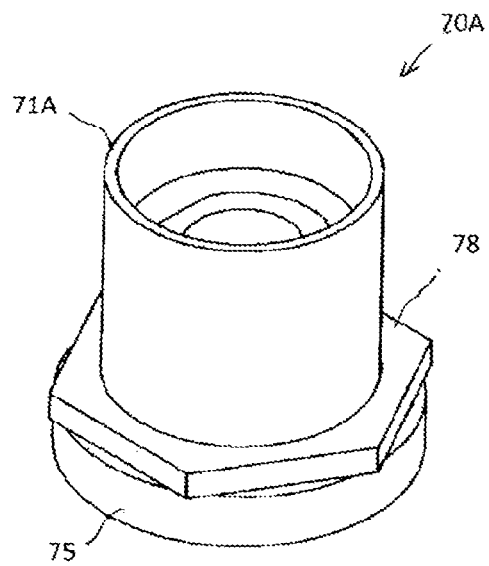
[Fig. 6]
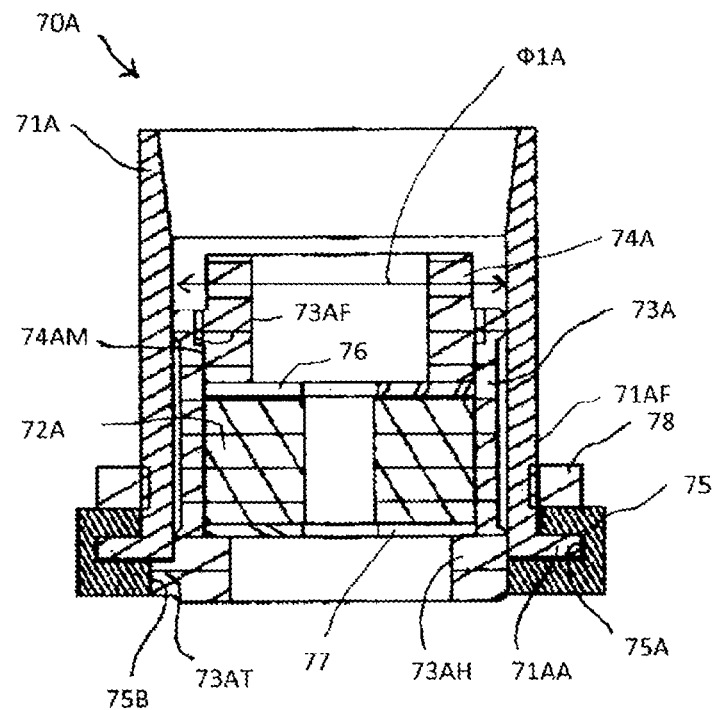

[Fig. 7]
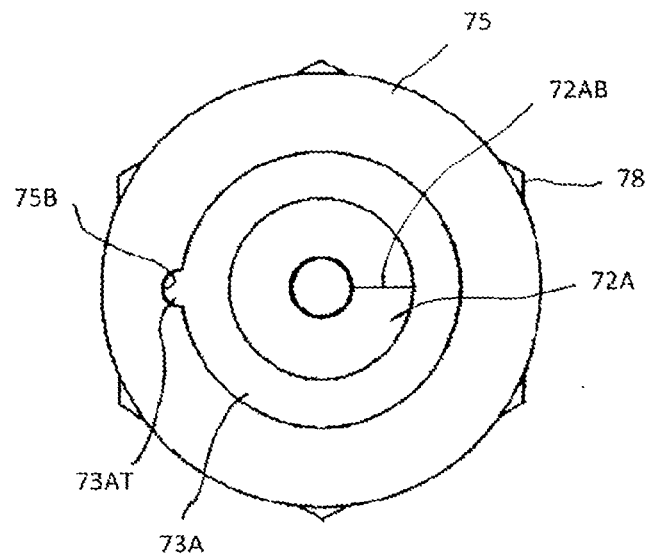
[Fig. 8]
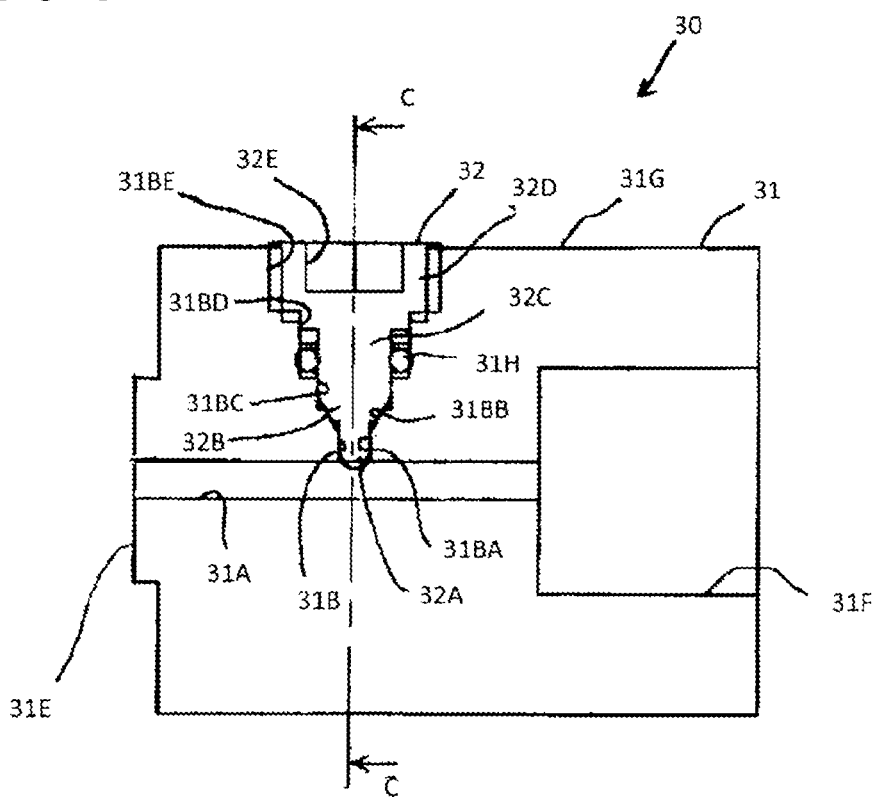

[Fig. 9]
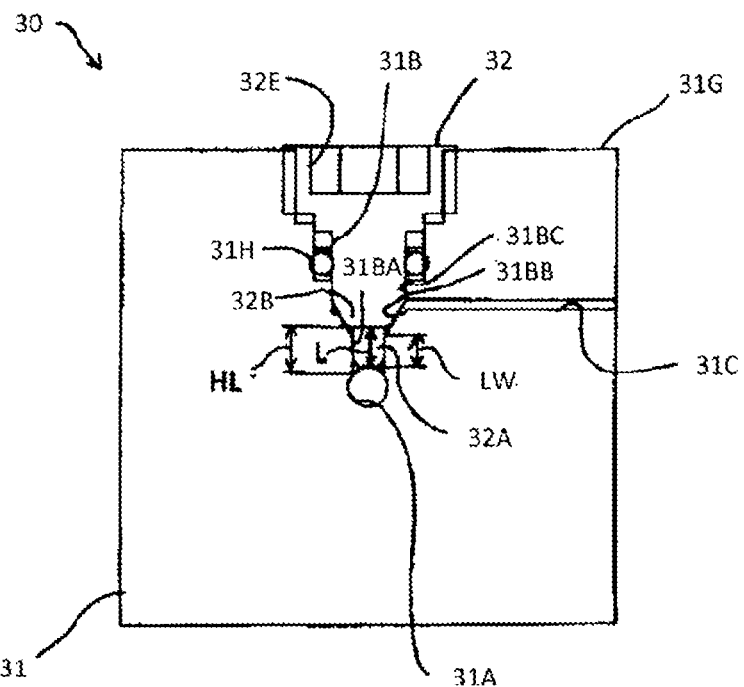
[Fig. 10]
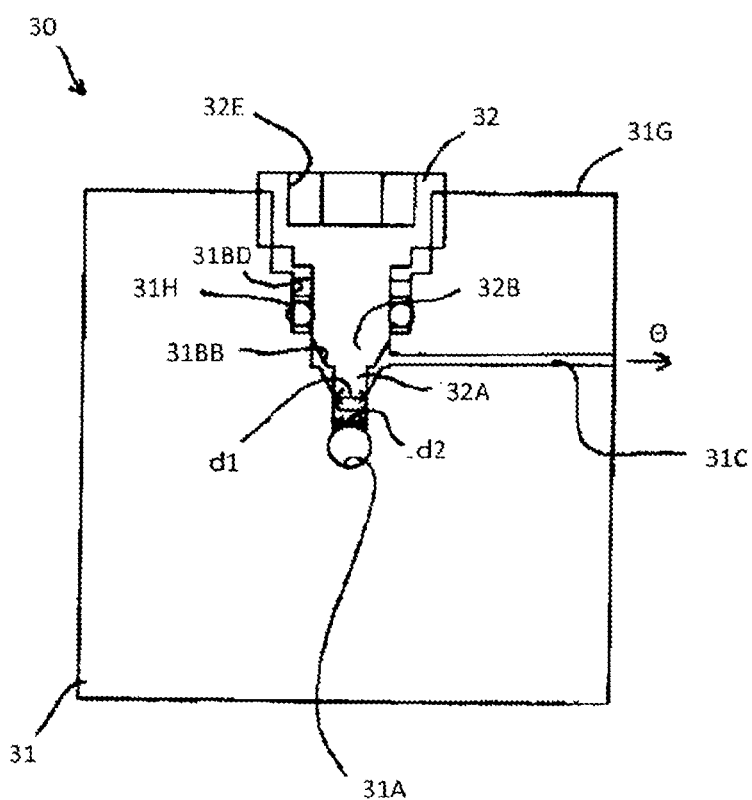

[Fig. 11]
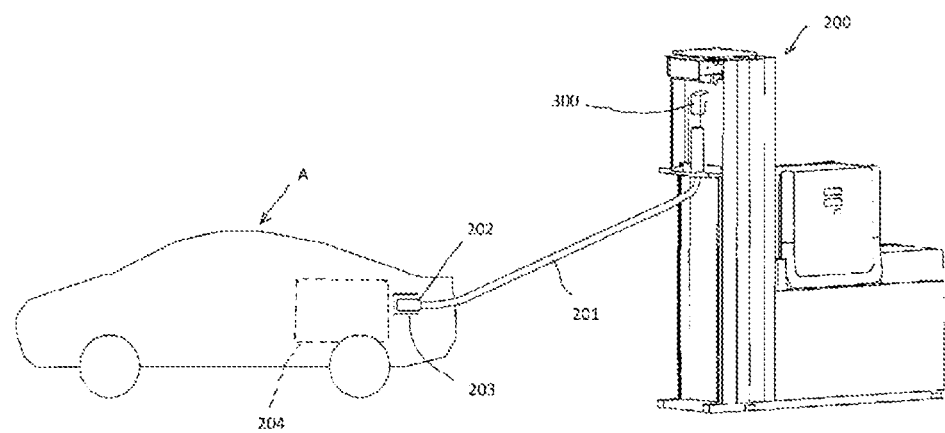

SAFETY JOINT

CROSS-REFERENCE TO RELATED APPLICATIONS

The present application claims priority to Japanese Patent Application No. 2017-135265 filed on Jul. 11, 2017, the disclosure of which are incorporated herein by reference.

STATEMENT RE: FEDERALLY SPONSORED RESEARCH/DEVELOPMENT

Not Applicable

BACKGROUND

1. Field of the Invention

The present invention relates to a safety joint for a fuel filling apparatus for filling fuel such as gasoline, light oil and hydrogen gas, more particularly to a safety joint for separating the fuel filling apparatus and a filling hose from each other in an emergency.

2. Description of the Related Art

For example, as show in FIG. 11, when fuel is fed to a vehicle A in a fuel feeding facility such as a gas station, a filling nozzle 202 mounted on an end of a filling hose 201 and a vehicle side filling port 203 are connected with each other to fill fuel into the vehicle side filling port 203. Here, when the vehicle A runs to pull the filling hose 201 while fuel is filled, a fuel filling apparatus 200 falls to be broken, and fuel is discharged, so that it becomes a dangerous condition. Then, a safety joint 300 for emergency releasing is mounted between the fuel filling apparatus 200 and the filling hose 201, and when to the filling hose 201 is applied a tensile force more or equal to a predetermined value, the safety joint 300 separates to prevent the fuel filling apparatus 200 from being broken.

However, in case that the tensile force more or equal to the predetermined value is not applied to the filling hose 201, when the filling hose 201 swings, there is a possibility that moment generated by the swinging of the filling hose 201 acts on a filling hose attached portion of a vehicle side member (plug) of the safety joint 300, and the attached portion is broken to leak a fuel through the broken portion. Conventionally, any measures are not taken to prevent that the moment generated by the swinging of the filling hose 201 breaks the plug of the safety joint 300.

In other conventional techniques, as a safety joint for a hydrogen gas filling apparatus are proposed safety joints for emergency releasing whose passages of the plug and the socket are orthogonal with each other (refer to Japanese patent publication No. 2007-120717 gazette for example), but a safety joint capable of preventing the safety joint from being broken due to the moment generated by the swinging of the filling hose 201 has not been proposed yet.

The contents of Japanese Patent Publication No. 2007-120717 is incorporated herein by reference in their entirety.

BRIEF SUMMARY

The present invention has been made in consideration of the above problems in the prior art, and the object thereof is to provide a safety joint capable of preventing the safety joint from being broken due to the moment generated by the swinging of the filling hose and surely separating a fuel filling apparatus side member and the vehicle side member from each other when the tensile force more or equal to the predetermined value is applied to the filling hose to prevent the fuel filling apparatus from being broken.

A safety joint 100 according to the present invention is characterized by including a plug (10: vehicle side member) with a cylindrical shape in which a passage (1A: in-plug passage) is formed, a socket (20) in which a passage (21A: in-socket passage) continuing to the passage (1A) in the plug (10) is formed, and a shut off valve mounted on the passage (21A: in-socket passage) in the socket (20), the shut off valve opening when the plug (10) being inserted into the socket (20) and closing when the plug (10) being disconnected therefrom, wherein central axes of the passages of the plug (10) and the socket (20) form a straight line, a filling hose (61) is connected to the plug (10), and hose guides (70, 70A) for limiting movement of the filling hose (61) at a position separated from the plug (10). It is preferable that the safety joint (100) according to the present invention is arranged near a base portion of the filling hose (61) communicating with a filling nozzle and near a weighing machine (fuel filling apparatus).

In the present invention, it is preferable that the hose guides (70, 70A) include outer cylinders (71, 71A), elastic members (72, 72A) for surrounding the filling hose (61), elastic member accommodating portions (73, 73A) accommodating the elastic members (72, 72A) in a hollow portion, and lid portions (74, 74A) engaging with the elastic member accommodating portions (73, 73A) to close the hollow portion, and inner diameter sizes ($\varphi 1$, $\varphi 1A$) of the outer cylinders (71, 71A) are larger than the maximum diameter (D1) of the plug (10).

Here, it is preferable that the hose guide (70A) is fixed by an outer cylinder fixing portion (75), a projection (73AT) projecting outward in a radial direction of the hose guide (70A) is formed on an end portion (a lower end portion in FIG. 6) of the elastic member accommodating portion (73A) of the hose guide (70A), and a channel (75B) capable of accommodating the projection (73AT) is formed on an inner peripheral surface of the outer cylinder fixing portion (75).

In addition, in the present invention, when hydrogen gas is used as fuel, it is preferable that one of the plug (10) and the socket (20) includes a depressurizer (30) including a main body portion (31) made of metal, a depressurizing communication hole (31B) communicating with a fuel passage (31A) in the main body portion(31), a depressurizing plug (32) made of metal, the depressurizing plug (32) capable of being inserted into the depressurizing communication hole (31B), and tapered portions (a pin tapered portion 32B of the depressurizing plug 32 and a tapered portion 31BB of the depressurizing communication hole 31B) formed on the depressurizing communication hole (31B) and the depressurizing plug (32) respectively, the tapered portions having complemental shapes with each other.

In this case, it is preferable that a relief circuit (31C) for discharging filled fluid (hydrogen gas, for example) is formed, the relief circuit (31C) communicates with the depressurizing communication hole (31B), and an outlet of the relief circuit (31C) is formed at a position separated from an upper region of the depressurizing plug (32). In the depressurizer (30), it is preferable that length (L) of a fuel passage side end portion (32A: pin end portion) of the depressurizing plug (32) and a length (HL) of a fuel passage side end portion (31BA: small diameter portion) of the depressurizing communication hole (31B) are long.

In the present invention, as fuel to be supplied or filled can be used gaseous fuel such as hydrogen gas, and liquid fuel such as gasoline, light oil and kerosene can be used also.

With the present invention with the above construction, the filling hose (61) is securely held by the small diameter portions (portions with inner diameter φ) of the hose guides (70, 70A) and the plug (10) side end portion of the safety joint (100). A swinging of the hose (61) is perfectly shut at the portion held by the small diameter portions (portions with inner diameter φ) of the hose guides (70, 70A) and is not transmitted to the plug (10) side of the safety joint (100). Therefore, moment generated by the swinging of the hose (61) do not act on the plug (10) of the safety joint (100), and it is prevented that the plug (10) is broken.

In addition, in the safety joint (100) according to the present invention, when the inner diameters (φ1, φ1A) of the outer cylinders (71, 71A) of the hose guides (70, 70A) are larger than an outer diameter (D1: maximum diameter) of the plug (10) of the safety joint (100), even if a tensile force more or equal to a predetermined value is applied to the filling hose (61) due to a sudden movement of the vehicle during fuel filling for instance to separate the socket (20) and the plug (10) from each other, the separated plug (10) passes through the insides of the outer cylinders (71, 71A) of the hose guides (70, 70A). Therefore, a tensile force applied to the filling hose (61) does not act on the fuel filling apparatus, it is prevented that the fuel filling apparatus falls and breakage thereof due to the fall.

In the present invention, with the hose guides (70, 70A) including the outer cylinders (71, 71A) whose inner diameter sizes (φ1, φ1A) are larger than the maximum diameter (D1) of the plug (10), the elastic members (72, 72A) for surrounding the filling hose (61), the elastic member accommodating portions (73,73A) for accommodating the elastic members (72, 72A) in the hollow portion, and the lid portions (74, 74A) engaging with the elastic member accommodating portions (73, 73A) to close the hollow portion, when a tensile force more or equal to the predetermined value is applied to the filling hose (61) to separate the socket (20) and the plug (10) from each other, not only the filling hose (61) and the plug (10) but also the elastic member accommodating portions (73, 73A), the lid portions (74, 74A), the elastic members (72, 72A) of the hose guides (70, 70A) can pass through areas inside the outer cylinders (71,71A) in a radial direction of the hose guides (70, 70A). Then, the plug (10) surely moves on the vehicle side from the hose guides (70, 70A), the tensile force toward the vehicle is not applied to the socket (20) and the fuel filling apparatus, and it is surely prevented that the fuel filling apparatus falls or breaks.

Here, when the outer cylinder (71A) is fixed by the outer cylinder fixing portion (75), on the end portion (lower end portion in FIG. 6) of the elastic member accommodating portion (73A) of the hose guide (70A) is formed the projection (73AT) projecting outward in a radial direction of the hose guide (70A), and on the inner peripheral surface of the outer cylinder fixing portion (75) is formed the channel (75B) capable of accommodating the projection (73AT), the projection (73AT) fits into the channel (75B), which prevents the outer cylinder fixing portion (75) and the elastic member accommodating portion (73A) from rotating relative to each other. Then, even if a twist occurs on the filling hose (61), at the portion where the filling hose (61) is held by the elastic member (72A) is suppressed rotation of the filling hose (61), so that it is prevented that the rotating force due to the twist acts on the plug (10) to break it.

In addition, in the present invention, when hydrogen gas is used for fuel, with the depressurizer (30) mounted on one of the plug (10) and the socket (20), when the plug (10) and the socket (20) are separated from each other, high pressure hydrogen gas in the filling hose (61) can be discharged at small flow rate outside the filling hose (61) (outside the depressurizer 30). Therefore, it is prevented that the high pressure hydrogen gas rapidly injects, and the filling hose (61) unexpectedly moves around due to the rapid injection of the hydrogen gas.

BRIEF DESCRIPTION OF THE DRAWINGS

FIG. 1 is a cross sectional view showing a safety joint with a hose guide according to an embodiment of the present invention;

FIG. 2 is an explanatory disconnection view showing a condition that a plug and a socket of the safety joint are separated from each other and the plug is pulled together with a filling hose and inner members of the hose guide;

FIG. 3 is an explanatory cross sectional view showing a condition that the plug and the socket are connected with each other in the embodiment;

FIG. 4 is an explanatory cross sectional view showing a condition that the plug and the socket are separated from each other in the embodiment;

FIG. 5 is a perspective view showing a hose guide different from the hose guide shown in FIGS. 1 and 2;

FIG. 6 is a cross sectional view showing the hose guide shown in FIG. 5;

FIG. 7 is a bottom view showing the hose guide shown in FIGS. 5 and 6;

FIG. 8 is a cross sectional view showing a depressurizer in the embodiment;

FIG. 9 is a cross sectional view taken along the C-C line in FIG. 8;

FIG. 10 is a cross sectional view showing a condition that a risen depressurizing plug allows hydrogen gas to outflow from a relief circuit; and FIG. 11 is a brock diagram showing an outline of a fuel filling facility.

DETAILED DESCRIPTION

Hereinafter, an embodiment of the present invention will be explained with reference to the attached drawings. As described above, as fuel filled or supplied by a fuel filling apparatus with a safety joint according to the present invention can be used gaseous fuel such as hydrogen gas, liquid fuel such as gasoline, light oil and kerosene can be used also, and in the embodiment shown in the figures will be explained a case that the safety joint is mounted on a hydrogen filling apparatus for filling hydrogen gas into a vehicle.

In FIG. 1, a whole safety joint (pipe joint for emergency releasing) according to the embodiment is shown as the numeral 100. The safety joint 100 includes a plug 10 with a cylindrical shape and a socket 20. When the plug 10 and the socket 20 are connected with each other, shutoff valves in the plug 10 and the socket 20 open to communicate an in-plug passage 1A (FIG. 3) with an in-socket passage 21A (FIG. 3). As explained later with reference to FIGS. 3 and 4, in FIG. 1, the plug 10 and the socket 20 are connected with each other, but when the plug 10 is separated from the socket 20, the shutoff valves therein close as shown in FIG. 2. The plug 10 is basically connected to a vehicle side (lower side in FIG. 1), and the socket 20 is basically communicated with a hydrogen filling apparatus (or a dispenser, a weighing machine) side. However, it is possible to arrange the plug 10 to a hydrogen filling apparatus side and arrange the socket 20 to the vehicle side.

In FIGS. 1 and 2, the socket 20 is mounted through a base member 80 to the hydrogen filling apparatus not shown. For example, as shown in FIG. 3, central axes of the passage in the plug 10 (in-plug passage 1A) and the passage in the socket 20 (in-socket passage 21A) form a straight line. In FIG. 1, to the line is attached the symbol C1.

In FIG. 1, on a vehicle side end portion (lower end portion in FIG. 1) of the plug 10 is mounted a depressurizer 30. As shown in FIG. 1, to the depressurizer 30 is connected a vehicle side filling hose 61 thorough a concaved portion 31F. Construction and function of the depressurizer 30 will be explained in detail with reference to FIGS. 8 to 10. However, the depressurizer 30 can be omitted, in such a case, the vehicle side filling hose 61 is directly connect to the plug 10.

On an end portion of the filling hose 61 opposite to the plug 10 side is arranged a filling nozzle not shown. As described above, the socket 20 is connected to the hydrogen filling apparatus side, and the safety joint 100 is arranged near the hydrogen filling apparatus and a base portion of the filling hose 61.

In a direction that the filling hose 61 extends (lower side in FIG. 1), at a position apart from the plug 10 is arranged a hose guide 70 for limiting movement (swinging) of the filling hose 61. In FIG. 1, the hose guide 70 is provided with an outer cylinder 71, an elastic member 72 for surrounding the filling hose 61, an elastic member accommodating portion 73 for accommodating the elastic member 72 in a hollow portion, and a lid portion 74 for closing the hollow portion of the elastic member accommodating portion 73. The outer cylinder 71 with a cylindrical shape accommodates the elastic member 72, the elastic member accommodating portion 73, and the lid portion 74 (members constructing the hose guide 70), and the outer cylinder 71 is attached through the base member 80 to a hydrogen filling apparatus not shown. Here, the inner diameter size φ1 of the outer cylinder 71 is slightly larger than the maximum diameter D1 of the plug 10.

In FIG. 1, the elastic member 72 with a columnar shape has a hole (small diameter portion) whose inner diameter is φ on a central portion in a radial direction, into the hole is inserted the filling hose 61, and as a material of the elastic member 72 is selected an elastic member such as rubber. The inner diameter φ of the small diameter portion (when the elastic member 72 is accommodated in the accommodating portion 73) is set slightly larger than the outer diameter of the filling hose 61, so that the elastic member 72 surrounds the filling hose 61 while tightening it to support it. Although not shown in figures, in a radial direction of the elastic member 72 is formed a cut surface (corresponding to numeral 72AB in FIG. 7), and opening the elastic member 72 through the cut surface allows the elastic member 72 to be arranged to surround (wind around) the filling hose 61.

In FIG. 1, the elastic member accommodating portion 73 with a cylindrical shape is provided with a hollow portion for accommodating the elastic member 72, and a supporting portion 73H for supporting the elastic member 72 in a vertical direction in FIG. 1. A safety joint side (upper side in FIG. 1) end portion of the inner peripheral surface of the elastic member accommodating portion 73 projects radially inward, on an inner periphery in a radial direction of the projecting portion is formed a female screw 73F, and the female screw 73F engages with a male screw 74M of an outer peripheral surface of the lid portion 74. Then, the maximum outer diameter of the elastic member accommodating portion 73 is set smaller than the inner diameter size φ1 of the outer cylinder 71. The lid portion 74 is formed in a hollow cylindrical shape (section of the lid portion is annular) including a hollow portion 74S, and on an outer peripheral surface is formed the male screw 74M. In FIG. 2, numerals 76 and 77 express thrust washers.

As described above, the outer cylinder 71 of the hose guide 70 is attached through the base member 80 to the hydrogen filling apparatus. When the filling hose 61 is mounted to the safety joint 100, the filling hose 61 pass through the outer cylinder 71, the elastic member accommodating portion 73, the thrust washers 76, 77, the hollow portion of the lid portion 74 of the hose guide 70, and the safety joint 100 side end portion of the filling hose 61 is connected to the depressurizer 30. When the depressurizer 30 is omitted, the end portion of the filling hose 61 is directly connected to the plug 10. Next, the elastic member 72 is arranged between the thrust washers 76, 77, the elastic member 72 is opened from the cut surface, and the elastic member 72 is arranged to surround the filling hose 61.

Then, the elastic member 72, the elastic member accommodating portion 73, the lid portion 74 and the thrust washers 76, 77 configuring the house guide 70 are accommodated in the outer cylinder 71, the male screw 74M of the lid portion 74 is screwed to the female screw 73F of the elastic member accommodating portion 73, and the lid portion 74 is rotated in a direction compressing the elastic member 72. The compression of the lid portion 74, allows elastically repulsive force of the elastic member 72 to act as a force for tightening the filling hose 61. And, the elastic member 72 is accommodated and fixed in the elastic member accommodating portion 73. In addition, after the elastic member 72 is accommodated in the elastic member accommodating portion 73, and the elastic member accommodating portion 73, the thrust washers 76, 77 and the lid portion 74 are accommodated in the outer cylinder 71, and the filling hose 61 can be connected to the safety joint 100 side end portion.

In FIG. 1 showing a condition that the plug 10 and the socket 20 are connected with each other, the filling hose 61 is connected to the plug 10 side, and extends through the hose guide 70 on the vehicle side. At that time, as described above, the filling hose 61 is held or fixed by the elastic member 72 while being tightened thereby. When the filling hose 61 swings, the swings thereof are perfectly shut at a portion supported by the elastic member 72 of the hose guide 70, and do not transmit on the side of the plug 10 of the safety joint 100. Therefore, swings of the filling hose 61 do not act on the plug 10 of the safety joint 100, and it is prevented that the plug 10 or the depressurizer 30 is broken.

As described above, the inner diameter φ1 of the outer cylinder 71 of the hose guide 70 is set larger than the maximum outer diameter D1 of the plug 10 of the safety joint 100. In addition, the maximum outer diameter of the elastic member accommodating portion 73 of the hose guide 70 is set slightly smaller than the inner diameter size φ1 of the outer cylinder 71. For example, when the vehicle rapidly moves while hydrogen is filled thereto and a tensile force (arrow F: FIG. 2) more or equal to a predetermined value is applied to the filling hose 61, as shown in FIG. 2, the socket 20 and the plug 10 of the safety joint 100 are separated from each other.

When the plug 10 is separated from the socket 20, as shown in FIG. 2, the filling hose 61, the plug 10 and the depressurizer 30 enter into an area inside the outer cylinder 71 of the hose guide 70 in a radial direction thereof, passes through the outer cylinder 71, and moves toward the vehicle side (lower side in FIG. 2). At that time, members accommodated in the outer cylinder 71 of the hose guide 70 (the elastic member 72, the elastic member accommodating portion 73, the lid portion 74, and the thrust washers 76, 77) do not stay at a position inside the outer cylinder 71 of the hose guide 70, and move toward the vehicle side from the outer cylinder 71 together with the plug 10 and the filling hose 61.

Therefore, when a tensile force more or equal to a predetermined value acts on the filling hose 61 to separate the plug 10 and the socket 20 from each other, the plug 10 will not be caught in the hose guide 70, and the hydrogen filling apparatus will not be pulled on the vehicle side, which prevents the hydrogen filling apparatus from being fallen or broken. In other words, the hose guide 70 has a function of shutting the swinging of the filling hose 61 and not transmitting a moment generated by the swinging to the plug 10, and a function of allowing the plug 10 to pass through an area inside the outer cylinder 71 in a radial direction thereof, and preventing a tensile force from acting on the hydrogen filling apparatus when the socket 20 and the plug 10 are separated from each other.

In the embodiment shown in the figures, the depressurizer 30 can be configured to be accommodated in the hollow portion 74S inside the lid portion 74 of the hose guide 70 in a radial direction thereof. With this construction, when the plug 10 is separated from the socket 20, even if the depressurizer 30 collides to the hollow portion 74S of the lid portion 74, an impact generated by the collision is absorbed by the elastic member 72. When the depressurizer 30 is omitted, it is possible that the lid portion 74 accommodates the plug 10 in the hollow portion 74S. Further, it is possible that the lid portion 74 does not accommodate the depressurizer 30 and the plug 10 in the hollow portion 74S.

Next, the plug 10 and the socket 20 of the safety joint 100 will be explained with reference to FIGS. 3 and 4. However, in FIGS. 3 and 4, the filling hose and the hose guide 70 configuring the safety joint 100 are not illustrated. In FIGS. 3 and 4, the safety joint 100 connects the socket 20 with plug 10 (in nonoperation) or disconnects the plug 10 from the socket 20 (in operation) by a mechanism with a spring holder 42 on which a connecting balls 40 and a connecting spring 41 are mounted.

In a condition that the plug 10 and the socket 20 are connected with each other, ends of a socket side pin 22 and a plug side pin 2 (a pin connecting end 11) contact with each other to form a straight line, and they are pressed with each other. Therefore, the socket side pin 22 is pressed by the plug side pin 2, and moves leftward against elastically repulsive force of a socket side spring 23 in FIG. 3. As a result, a socket side valve element 25 is separated from a socket side valve seat 27 to open a shut off valve 24. On the other hand, the plug side pin 2 is pressed by the socket side pin 22, and moves rightward against elastically repulsive force of a plug side spring 4 in FIG. 3. As a result, a plug side valve element 6 is separated from a plug side valve seat 7 to open a shut off valve 5. In a condition that the socket 20 and the plug 10 are connected with each other as shown in FIG. 3, hydrogen gas fed from the hydrogen filling apparatus side not shown passes through the in-socket passage 21A and the in-plug passage 1A, and is fed through a filling hose (not shown) mounted on the plug 10 side and is fed to the vehicle side. The in-socket passage 21A and the in-plug passage 1A are formed to have the same axes as those of the socket side pin 22 and the plug side pin 2 respectively, and the axes of the in-socket passage 21A and the in-plug passage 1A form a straight line.

When an excessive tensile force more or equal to a predetermined value acts on the filling hose due to a trouble that a vehicle starts while hydrogen is filled, the socket 20 and the plug 10 are separated from each other (in operation) due to the mechanism including the connecting balls 40 and the connecting spring 41 as shown in FIG. 4. In operation shown in FIG. 4, the socket 20 and the plug 10 are separated from each other, the socket pin 22 and the plug side pin 2 are not pressed with each other. Therefore, the socket pin 22 moves rightward due to elastically repulsive force of the socket side spring 23 in FIG. 4, the socket side valve 25 sits on the socket side valve seat 27, the shut off valve 24 is shut, and the in-socket passage 21A is shut. On the other hand, the plug side pin 2 moves leftward due to elastically repulsive force of the plug side spring 4 in FIG. 4, the plug side valve element 6 sits on the plug side valve seat 7, the shut off valve 5 is closed, and the in-plug passage 1A is shut. As a result, in a condition that the socket 20 and the plug 10 are separated from each other (in operation), it is prevented that high pressure hydrogen gas is discharged through the socket 20 or the plug 10.

In the safety joint 100 for emergency releasing shown in FIGS. 3 and 4, parts of the socket side pin 22 and the plug side pin 2 locate in the in-socket passage 21A or in-plug passage 1A respectively. Therefore, to prevent hydrogen gas from leaking are mounted a socket side pin connecting end side sealing member 28 (O-ring, for example) and a plug side pin connecting end side sealing member 8 (O-ring, for example). With the sealing members 28, 8, when high pressure hydrogen gas is filled also, pressure in a position where ends of the socket side pin 22 and the plug side pin 2 contact with each other (pin connected end 11) is maintained as same as the atmospheric pressure.

Here, when high pressure hydrogen gas is filled, to prevent that hydrogen gas goes around a socket side pin another end 22A and a plug side pin another end 2A and pressures therein become high are mounted a socket side pin another end side sealing member 29 (O-ring, for example) and a plug side pin another end side sealing member 9 (O-ring, for example). When the sealing members 29, 9 are not mounted to increase the pressures in the another ends 22A and 2A, forces that the ends of the socket side pin 22 and the plug side pin 2 are pressed with each other increases to exceed a predetermined value of the safety joint 100 for emergency releasing, and the socket 20 and the plug 10 are separated from each other.

Next, with reference to FIGS. 5 to 7 will be explained a hose guide in a mode different from the hose guide 70 shown in FIGS. 1 and 2. The hose guide 70 shown in FIGS. 1 and 2 shuts swinging of the filling hose 61 to prevent moment by the swinging from acting on the plug 10 of the safety joint 100. And, when the socket 20 and the plug 10 are disconnected from each other, the plug 10 can pass through inside of the outer cylinder 71 of the hose guide 70, so that it is prevented that the hydrogen filling apparatus falls. In addition to that, a hose guide, the whole of which is indicated by the numeral 70A in FIGS. 5 to 7, has a function of preventing a portion of the hose on the safety joint 100 side from the hose guide 70A from rotating when a twist occurs in the filling hose 61 (FIGS. 1 and 2).

The hose guide 70A has an outer cylinder 71A, an elastic member 72A surrounding the filling hose 61, an elastic member accommodating portion 73A accommodating the elastic member 72A in a hollow portion, and a lid portion 74A for closing the hollow portion of the elastic member accommodating portion 73A, and further includes an outer cylinder fixing portion 75 and a nut 78 for tightening the outer cylinder fixing portion 75 downward in FIG. 6. In FIG. 6, the outer cylinder 71A with a hollow cylindrical shape accommodates the elastic member 72A, the elastic member accommodating portion 73A, and the lid portion 74A. On a lower end of the outer cylinder 71A is formed a flange 7 IAA projecting radially outward over an entire circumference. In addition, in the outer peripheral surface of the outer cylinder 71A, from an upper end portion to near of a lower end portion is formed a male screw 71AF screwed to a female screw of the nut 78.

As same as the explanation with reference to FIGS. 1 and 2, the elastic member accommodating portion 73A has a hollow portion for accommodating the elastic member 72A, a supporting portion 73AH for supporting the elastic member 72A in a vertical direction (FIG. 6), and a female screw 73AF on an inner peripheral surface. However, on the lower end portion (FIG. 6) of the elastic member accommodating portion 73A is formed a projection 73AT projecting radially outward. The projection 73AT can be formed at one spot in a radial direction, but plurality of projection 73AT can be formed at plural spots.

The outer cylinder fixing portion 75 is arranged on an outer periphery of the lower end portion of the outer cylinder 71A, on an inner peripheral surface of the outer cylinder fixing portion 75 is formed a channel 75A, and into the channel 75A can be accommodated the flange 71AA of the outer cylinder 71A. In order to facilitate insertion of the flange 71AA into the channel 75A to mount the flange 71AA to the channel 75A, although not clearly shown in figures, it is preferable that the outer cylinder fixing portion 75 is divided into two parts in a radial direction, or configured like a nest. On the inner peripheral surface of the outer cylinder fixing portion 75 is formed a channel 75B capable of accommodating the projection 73AT of the elastic member accommodating portion 73A, and the channel 75B extends in a longitudinal direction of a filling hose not shown, that is, in a vertical direction in FIG. 6 and opens at a lower end portion of the outer cylinder fixing portion 75. Although not clearly shown in FIGS. 5 to 7, the outer cylinder fixing portion 75 is fixed to the hydrogen filling apparatus by a known method.

The elastic member 72A and the lid portion 74A are the same as the elastic member 72 and the lid portion 74 shown in FIGS. 1 and 2 respectively. The numeral 72AB shown in FIG. 7 indicates a cut surface formed in a radial direction of the elastic member 72A, opening from the cut surface 72AB causes the elastic member 72A to be arranged to surround the filling hose 61 or to wind around the filling hose 61. Although not clearly shown in FIGS. 1 and 2, on the elastic member 72 shown in FIGS. 1 and 2 is formed the same cut surface as the cut surface 72AB. In FIG. 6, the numerals 76 and 77 indicate thrust washers.

When the filling hose 61 is mounted on the safety joint 100, the flange 71AA of the outer cylinder 71A is inserted into the channel 75A of the outer cylinder fixing portion 75; the nut 78 is screwed to the male screw 71AF of the outer peripheral surface of the outer cylinder 71A; the outer cylinder fixing portion 75 is sandwiched between the nut 78 and the flange 71AA of the outer cylinder 71A; and the outer cylinder 71A is fixed to the outer cylinder fixing portion 75. The outer cylinder fixing portion 75 to which the outer cylinder 71A is fixed is fixed through a base member not shown to the hydrogen filling apparatus side for example. Then, the filling hose 61 passes through the elastic member accommodating portion 73A, the thrust washers 76, 77, the lid portion 74A, the outer cylinder 71A, the outer cylinder fixing portion 75, the hollow portion of the nut 78, and the safety joint 100 side end portion of the filling hose 61 is connected to the depressurizer 30. However, when the depressurizer 30 is omitted, the safety joint 100 side end portion of the filling hose 61 is connected to the plug 10.

Then, the elastic member 72A is opened from the cut surface 72AB to surround the filling hose 61. And, the lid portion 74A, the thrust washer 76, the elastic member 72A, the thrust washer 77, the elastic member accommodating portion 73A are accommodated in the hollow portion of the outer cylinder 71A. When the elastic member accommodating portion 73A is accommodated, a position of the projection 73AT in a circumferential direction matches with a position of the channel 75B of the outer cylinder fixing portion 75 in a circumferential direction, and the elastic member accommodating portion 73A is inserted from an opened portion on a lower portion in FIG. 6 into the channel 75B. Then, the male screw 74AM of the lid portion 74A is screwed to the female screw 73AF of the elastic member accommodating portion 73A, the lid portion 74A rotates to compress the elastic member 72A in a vertical direction of FIG. 6, and the elastic member 72A is fixed in the elastic member accommodating portion 73A.

In the hose guide 70A configured as shown in FIGS. 5 to 7, the projection 73AT of the elastic member accommodating portion 73A and the channel 75B of the outer cylinder fixing portion 75 action as a key and a key groove respectively, so that the elastic member accommodating portion 73A can move in a vertical direction of FIGS. 5 and 6 but cannot rotate relative to the outer cylinder fixing portion 75. Therefore, even if a twist occurs in the filling hose 61, rotation of the filling hose 61 is cancelled due to the projection 73AT of the elastic member accommodating portion 73A and the cannel 75B of the outer cylinder fixing portion 75. Further, the twist of the filling hose is suppressed and shut at a position held by the elastic member 72A. With this, even if the twist occurs in the filling hose 61, the twist or a force by which the filling hose 61 is going to be rotated is not transmitted to the plug 10 side, it is prevented that the rotation of the filling hose 61 breaks the depressurizer 30 or the plug 10. Other construction and action effect of the hose guide 70A shown in FIGS. 5 to 7 are the same as those of the hose guide 70 shown in FIGS. 1 and 2.

Next, the depressurizer 30 will be explained with reference to FIGS. 8 to 10. The depressurizer 30 is attached to the plug 10 of the safety joint 100, and has a function of discharging (depressurizing) high pressure hydrogen gas in an area on the vehicle side from the plug 10 of the filling hose 61 when the plug 10 and the socket 20 are separated from each other. In addition, hydrogen gas in an area on the hydrogen filling apparatus side from the socket 20 is depressurized by a depressurizing mechanism not shown on the hydrogen filling apparatus side. In addition, the depressurizer 30 is not required to be mounted when gaseous fuel such as the hydrogen gas is not used.

In FIG. 8, the depressurizer 30 has a metal depressurizer main body portion 31 with a nearly rectangular parallelepiped shape and a metal depressurizing plug 32, and the depressurizing plug 32 is configured to engage with (be screwed to) a depressurizing communication hole 31B of the main body portion 31. On a right side of the main body portion 31 is formed a concaved portion 31F, and to the concaved portion 31F is connected the vehicle side filling hose 61. Although not clearly shown, an end portion 31E on a left side of the main body portion 31 is connected to the plug 10 of the safety joint 100. On a central portion in a vertical direction of the main body portion 31 is formed a hydrogen gas passage 31A, and the hydrogen gas passage 31A communicates through the end portion 31E with the in-plug passage 1A on the plug 10 side and communicates through the concaved portion 31F with the filling hose 61.

In FIG. 8, the depressurizing communication hole 31B communicating from an upper surface 31G with the hydrogen gas passage 31A extends in a vertical direction, and with the depressurizing communication hole 31B communicates a relief circuit 31C (FIGS. 9 and 10). A cross sectional area of the relief circuit 31C is set small to be enough to add a sufficient pressure loss to a flowing hydrogen gas. Into the depressurizing communication hole 31B is fitted the depressurizing plug 32, and as shown in FIG. 9, engagement of the depressurizing plug 32 and the depressurizing communication hole 31B shuts the relief circuit 31C from the hydrogen gas passage 31A.

The depressurizing communication hole 31B has a small diameter portion 31BA communicating with the hydrogen gas passage 31A, a tapered portion 31BB, the first middle diameter portion 31BC, the second middle diameter portion 31BD, and a female screw portion 31BE communicating with the upper surface 31G. On the other hand, the depressurizing plug 32 has a pin end portion 32A with a minimum diameter in a lower end portion, a pin tapered portion 32B, a pin middle diameter portion 32C, a male screw portion 32D forming a male screw on an outer periphery. When the depressurizing plug 32 is fitted into the depressurizing communication hole 31B, the pin end portion 32A of the depressurizing plug 32 is inserted into the small diameter portion 31BA of the depressurizing communication hole 31B.

As shown in FIG. 8, the pin tapered portion 32B of the depressurizing plug 32 and the tapered portion 31BB of the depressurizing communication hole 31B are complementary shapes with each other, and the pin tapered portion 32B contacts the tapered portion 31BB. Here, the depressurizing plug 32 and the main body portion 31 are made of metal, so that a portion where the pin tapered portion 32B and the tapered portion 31BB contact with each other configures a so-called "metal seal". Between the pin middle diameter portion 32C of the depressurizing plug 32 and the second middle diameter portion 31BD of the pressurizing communication hole 31B is arranged an O-ring 31H, and the O-ring 31H prevents high pressure hydrogen gas from injecting upward in FIG. 10 from a gap between the depressurizing plug 32 and the depressurizing communication hole 31B when the depressurizing plug 32 sufficiently rises against the depressurizing communication hole 31B (in a condition that engagement between the depressurizing plug 32 and the main body portion 31 is released: refer to FIG. 10). On the depressurizing communication hole 31B is formed the female screw portion 31BE, and to the female screw portion 31BE is screwed a male screw formed on the outer periphery of the male screw portion 32D. In addition, on an upper surface of the depressurizing plug 32 is formed a hexagon socket 32E (plug hexagon socket), and a hexagonal rod spanner not shown is inserted into the plug hexagon socket 32E to be rotated when the depressurizing plug 32 is attached to/detached from the depressurizing communication hole 31B.

As shown in FIGS. 9 and 10, in an area near a boundary between the tapered portion 31BB and the first middle diameter portion 31BC, the depressurizing communication hole 31B communicates with the relief circuit 31C. As shown in FIGS. 8 and 9, in a condition that the depressurizing plug 32 is tightened to the depressurizing communication hole 31B, the pin tapered portion 32B and the tapered portion 31BB of the depressurizing communication hole 31B contact with each other to configure the metal seal, so that high pressure hydrogen gas flowing in the hydrogen gas passage 31A is completely shut by the metal seal and does not flow into the relief circuit 31C. On the other hand, when the plug 10 and the socket 20 are separated from each other, the depressurizing plug 32 is rotated in a depressurizing direction by the hexagonal rod spanner for example, the engagement between the female screw portion 31BE of the depressurizing communication hole 31B and the male screw portion 32D of the depressurizing plug 32 is released, the pin tapered portion 32B and the tapered portion 31BB of the depressurizing communication hole 31B are separated from each other, and the metal seal is released.

A condition that the metal seal is released is shown in FIG. 10. A diameter size d1 of the pin end portion 32A is set smaller than the inner diameter d2 of the small diameter portion 31BA of the depressurizing communication hole 31B (d1<d2), between an outer periphery of the pin end portion 32A and an inner periphery of the small diameter portion 31BA of the depressurizing communication hole 31B is formed an annular gap whose cross sectional area is $(\pi/4)(d2^2-d1^2)$. When the depressurization shown in FIG. 10 is performed, high pressure hydrogen gas filled in the hydrogen gas passage 31A inflows through the annular gap (working as an orifice) into the relief circuit 31C and passes through the relief circuit 31C to outflow from the depressurizer 30 as shown by the arrow O. At that time, the pressure of the hydrogen gas decreases when the hydrogen gas passes through the annular gap and the relief circuit 31C, so that it is prevented that the hydrogen gas suddenly injects from the relief circuit 31C. Then, it is prevented the filling hose 61 moves around. Here, a hydrogen gas outlet of the relief circuit 31C is mounted at a position apart from the plug hexagon socket 32E (above the depressurizing plug 32). Then, even if sparks generate by contacts between the hexagonal rod spanner and the plug hexagon socket 32E when the hexagonal rod spanner is inserted into the plug hexagon socket 32E to be rotated, a possibility that the hydrogen gas catches fire due to the sparks becomes extremely low, and safety thereof improves.

In FIGS. 8 to 10, as shown in FIG. 9 for example, in a condition the depressurizing plug 32 is tightened to the depressurizing communication hole 31B, a length L of the pin end portion 32A (vertical length in FIG. 9) and a length HL of the small diameter portion 31BA of the depressurizing communication hole 31B are relatively long, and a length LW of the pin end portion 32A inserted into the small diameter portion 31BA of the depressurizing communication hole 31B is relatively long also. Therefore, even if the hexagonal rod spanner is excessively rotated in the plug hexagon socket 32E, the pin end portion 32A will not be completely separated from the small diameter portion 31BA of the depressurizing communication hole 31B, a condition that the hydrogen gas passes through the annular gap between the small diameter portion 31BA and the pin end portion 32A (cross sectional area is $(\pi/4)(d2^2-d1^2)$) is maintained, and pressure of the hydrogen gas can be decreased due to the pressure loss.

Although not shown in figures, in the depressurizer 30, the length L of a hydrogen passage side end portion (pin end portion 32A) of the depressurizing plug 32 can be set shorter, on the upper surface 31G of the main body portion 31 can be mounted a lock pin inserted hole, into the lock pin inserted hole can be inserted a lock pin for suppressing the rotation of the hexagonal rod spanner.

Since the embodiment shown in the drawings are merely example, and the embodiment do not limit the technical scope of the present invention.

DESCRIPTION OF THE REFERENCE NUMERALS 1 plug main body
1A in-plug passage
2 plug side rod
10 plug
20 socket
21A in-socket passage
30 depressurizer
31 main body portion
31A hydrogen gas passage
31B depressurizing communication hole
31BA small diameter portion
31BB tapered portion
31C relief circuit
32 depressurizing plug
32A pin end portion
32B pin tapered portion
61 filling hose
70, 70A hose guides
71, 71A outer cylinders
72, 72A elastic members
73, 73A elastic member accommodating portions
73AT projection
74, 74A lid portions
75 outer cylinder fixing portion
75A, 75B channels
100 safety joint

What is claimed is:

1. A safety joint comprising a plug with a cylindrical shape in which a passage is formed, a socket in which a passage continuing to the passage in the plug is formed, and a shut off valve mounted on the passage in the socket, the shut off valve opening when the plug being inserted into the socket and closing when the plug being disconnected therefrom,
wherein central axes of the passages of the plug and the socket form a straight line,
a filling hose is connected to the plug, and
a hose guide for limiting movement of the filling hose at a position separated from the plug;
wherein the hose guide includes an outer cylinder, an elastic member for surrounding the filling hose, an elastic member accommodating portion accommodating the elastic member in a hollow portion, and a lid portion engaging with the elastic member accommodating portion to close the hollow portion, and an inner diameter size of the outer cylinder is larger than a maximum diameter of the plug.

2. The safety joint as claimed in claim 1, wherein the outer cylinder is fixed by an outer cylinder fixing portion, a projection projecting outward in a radial direction of the hose guide is formed on an end portion of the elastic member accommodating portion of the hose guide, and a channel capable of accommodating the projection is formed on an inner peripheral surface of the outer cylinder fixing portion.

3. The safety joint as claimed in claim 2, wherein one of the plug and the socket comprises a depressurizer including a main body portion made of metal, a depressurizing communication hole communicating with a fuel passage in the main body portion, a depressurizing plug made of metal, the depressurizing plug capable of being inserted into the depressurizing communication hole, and tapered portions formed on the depressurizing communication hole and the depressurizing plug respectively, the tapered portions having complemental shapes with each other.

4. The safety joint as claimed in claim 1, wherein one of the plug and the socket comprises a depressurizer including a main body portion made of metal, a depressurizing communication hole communicating with a fuel passage in the main body portion, a depressurizing plug made of metal, the depressurizing plug capable of being inserted into the depressurizing communication hole, and tapered portions formed on the depressurizing communication hole and the depressurizing plug respectively, the tapered portions having complemental shapes with each other.

5. The safety joint as claimed in claim 1 further comprising
a base member, the socket and the hose guide both being mounted to the base member.

6. A safety joint comprising a plug with a cylindrical shape in which a passage is formed, a socket in which a passage continuing to the passage in the plug is formed, and a shut off valve mounted on the passage in the socket, the shut off valve opening when the plug being inserted into the socket and closing when the plug being disconnected therefrom,
wherein central axes of the passages of the plug and the socket form a straight line,
a filling hose is connected to the plug, and
a hose guide for limiting movement of the filling hose at a position separated from the plug;
wherein one of the plug and the socket comprises a depressurizer including a main body portion made of metal, a depressurizing communication hole communicating with a fuel passage in the main body portion, a depressurizing plug made of metal, the depressurizing plug capable of being inserted into the depressurizing communication hole, and tapered portions formed on the depressurizing communication hole and the depressurizing plug respectively, the tapered portions having complemental shapes with each other.

7. The safety joint as claimed in claim 6 further comprising a base member, the socket and the hose guide both being mounted to the base member.

* * * * *